United States Patent
Thelen et al.

(10) Patent No.: US 6,755,459 B2
(45) Date of Patent: Jun. 29, 2004

(54) PEDESTRIAN PROTECTION ASSEMBLY

(75) Inventors: John L. Thelen, Lake Orion, MI (US); Lewis C. Smith, Coggeshall (GB)

(73) Assignee: Decoma E.S.E. Inc., Auroro (CA)

( * ) Notice: Subject to any disclaimer, the term of this patent is extended or adjusted under 35 U.S.C. 154(b) by 0 days.

(21) Appl. No.: 10/276,464

(22) PCT Filed: May 16, 2001

(86) PCT No.: PCT/CA01/00685
§ 371 (c)(1),
(2), (4) Date: May 8, 2003

(87) PCT Pub. No.: WO01/87672
PCT Pub. Date: Nov. 22, 2001

(65) Prior Publication Data
US 2003/0184122 A1 Oct. 2, 2003

Related U.S. Application Data
(60) Provisional application No. 60/204,637, filed on May 16, 2000.

(51) Int. Cl.$^7$ .............................................. B60R 27/00
(52) U.S. Cl. .................................. 296/187.04; 293/120
(58) Field of Search ....................... 296/187.04, 187.09, 296/193.09, 193.1, 203.02; 293/120

(56) References Cited

U.S. PATENT DOCUMENTS

3,836,188 A * 9/1974 Klees .......................... 293/120
5,141,273 A * 8/1992 Freeman ...................... 293/120

FOREIGN PATENT DOCUMENTS

| EP | 0 611 682 A1 | 2/1994 |
| FR | 2 445 783 | 1/1979 |
| GB | 2 069 940 | 1/1981 |

* cited by examiner

Primary Examiner—Lori L. Coletta
(74) Attorney, Agent, or Firm—Clark Hill PLC

(57) ABSTRACT

A pedestrian protection assembly for an automotive vehicle includes a bumper support beam rigidly secured to the frame of the vehicle. A bumper is supported on the support beam and spaced forwardly thereof by a resilient foam pad. The bumper includes a ramped rib engaged with the support beam for moving the bumper from a normal position to an impact position. A grill portion extends downwardly from the bumper and supports a facia chin below the bumper. A lower tubular support beam further supports the facia chin on the frame of the vehicle. The bumper moves rearwardly against the bumper support beam in response to front impact of the vehicle and the ramped rib forces the bumper downwardly to force the facia chin and lower tubular support beam downward and forward of the bumper.

8 Claims, 4 Drawing Sheets

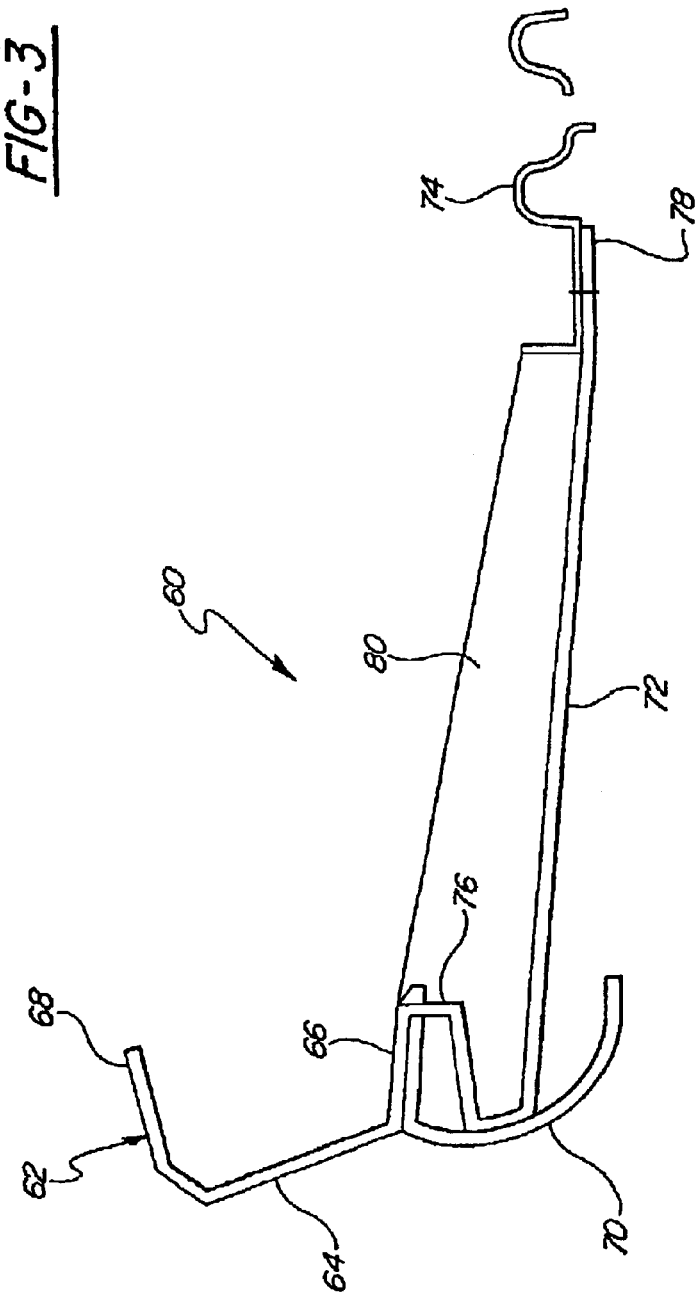

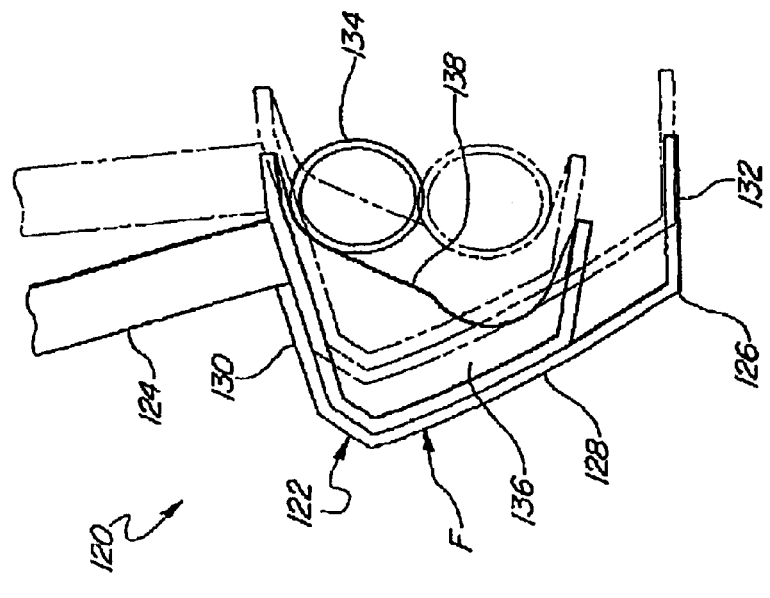
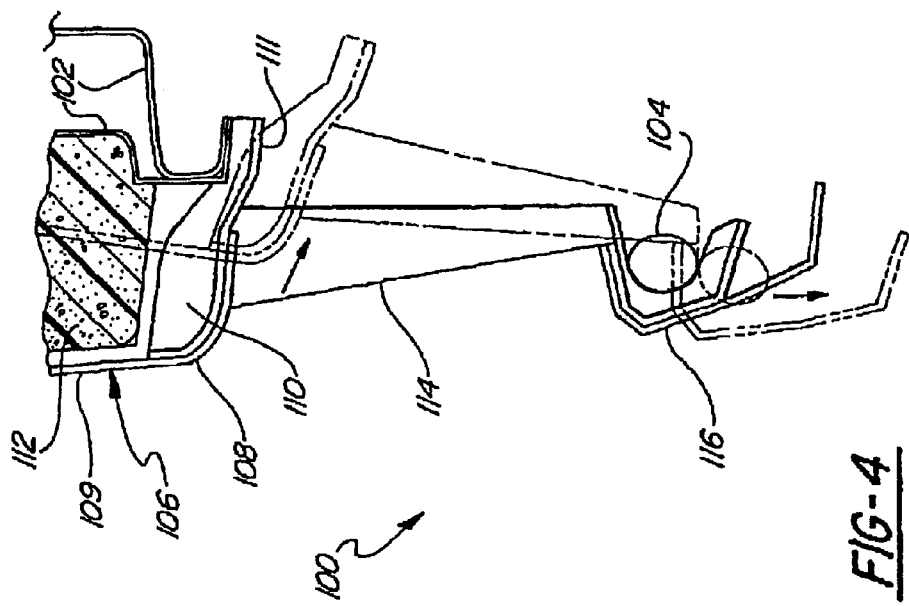

PEDESTRIAN PROTECTION ASSEMBLY

This application claims the benefit of Provisional Application No. 60/204,637, filed May 16, 2000.

BACKGROUND OF THE INVENTION

1. Field of the Invention

The subject invention relates to a pedestrian protection assembly for an automotive vehicle.

2. Description of the Prior Art

Automotive vehicles are known to include a front bumper secured to the frame of the vehicle for protecting the vehicle upon impact with another object or pedestrian. The front of the vehicle may also include a grill portion extending from the bumper for providing air circulation to the engine of the vehicle and decorative styling to the front of the vehicle. The grill portion may also support a lower spoiler for directing air flow to improve the aerodynamics of the vehicle and also accent the styling of the vehicle. Safety and pedestrian protection caused by the incidental impact of the vehicle with a pedestrian are also a concern for the design of the vehicle. Should the vehicle accidentally impact with a pedestrian, the front bumper tends to impact the pedestrian in the lower leg adjacent the knee of the pedestrian. Due to the height of the bumper from the ground supporting the vehicle, the impact of the bumper with the lower leg of the pedestrian may result in undesirable buckling of the pedestrian's knee and potentially cause undesirable injury.

Therefore, it is desirable to improve the structural design of the front of the vehicle and bumper area to provide pedestrian protection resulting from vehicle impact.

SUMMARY OF THE INVENTION

The subject invention relates to a pedestrian protection assembly supported by a bumper support beam of an automotive vehicle comprising a bumper operatively coupled to the bumper support beam. The bumper has an outer shell spaced from the support beam for supporting a resilient foam pad and a ramped rib projecting from the outer shell for engaging the bumper support beam. A grill portion extends from a first end connected to the outer shell of the bumper to a second end spaced below the bumper and the bumper support beam. A facia chin includes a top portion secured to the second end of the grill portion, a bottom portion and a front face. The assembly also includes a lower support member for supporting the facia chin between the top portion, bottom portion and front face. The ramped rib engages with the bumper support beam in response to an impact force applied against the outer shell of the bumper to automatically force the facia chin downwardly with the front face spaced forward of the bumper.

BRIEF DESCRIPTION OF THE DRAWINGS

Advantages of the present invention will be readily appreciated as the same becomes better understood by reference to the following detailed description when considered in connection with the accompanying drawings wherein:

FIG. 3 is another alternative embodiment of a pedestrian protection assembly;

FIG. 4 is yet another alternative embodiment of a pedestrian protection assembly having a moveable structural member; and FIG. 5 is still another alternative embodiment of a pedestrian protection assembly having another moveable structural member.

DETAILED DESCRIPTION OF THE PREFERRED EMBODIMENTS

Figure 1:
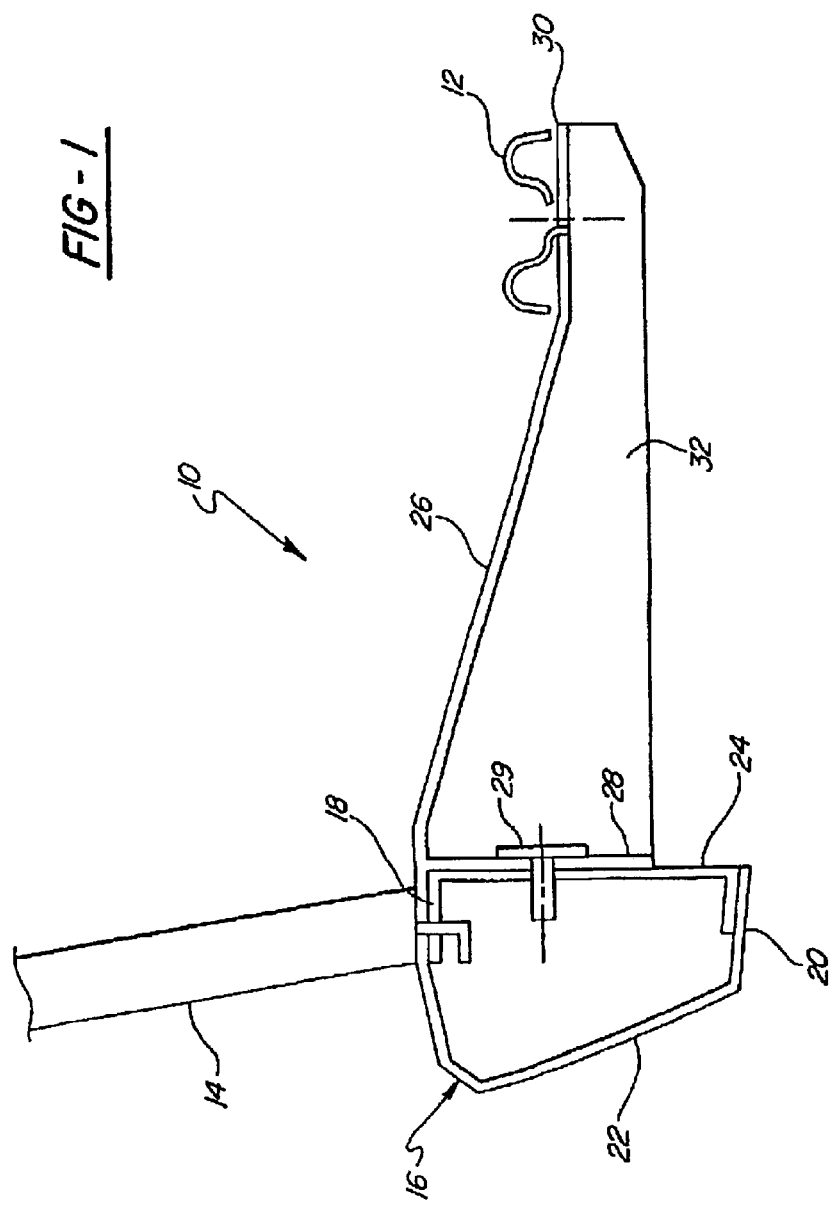
FIG. 1 is a cross-sectional side view of a pedestrian protection assembly according to the subject invention.

Referring to FIG. 1, a pedestrian protection assembly for an automotive vehicle is generally shown at 10. The assembly 10 includes rigid lower support 12, typically of a stamped material or tubular structural member, which is fixedly secured to the frame of the vehicle (not shown). The lower support 12 supports a portion of a radiator of the vehicle in a conventionally known manner. The assembly 10 further includes a front grill member 14 spaced forward of the lower support 12 and also fixedly secured to the frame of the vehicle as is commonly known in the art. The front grill member 14 is located in the front portion of the vehicle, typically below the vehicle bumper area and is typically of plastic construction. A facia chin 16 is fixedly secured to the lower portion of the grill 14 by any type of suitable fasteners, i.e. rivets, screws, plastic clips etc. The facia chin 16 of FIG. 1 is generally tubular in cross-section and includes an upper portion 18 connected to the grill 14, a lower portion 20 spaced opposite the upper portion 18, a front face 22, and a rear face 24 spaced opposite the front face 22. The assembly 10 also includes a rigid duct member 26 bridging the gap and fixedly secured between the facia chin 16 and the lower support 12. More specifically, the duct member 26 includes a first end 28 fixedly secured to the rear face 24 of the facia chin 16, by a fastener shown at 29, and a second end 30 fixedly secured to the lower support 12. The duct member 26 includes structural ribs 32 extending longitudinally between the first end 28 and the second end 30 to increase the structural rigidity of the duct member 26 between the facia chin 16 and the lower support 12.

In operation, should the front of the vehicle contact a pedestrian, the facia chin 16 is positioned to contact the lower leg portion of the pedestrian. Traditionally, the bumper of the vehicle would impact the pedestrian around the knee area and potentially cause knee buckling. Prior facia chins 16 were pliable and would potentially collapse upon impact with the lower leg of the pedestrian. The assembly 10 of the present invention is structurally rigid due to the duct member 26 such that when the facia chin 16 contacts the lower leg of the pedestrian, the pedestrian will more likely be lifted to avoid knee bucket or other more serious leg injury. The assembly 10 provides a uniform stiffness across the front of the vehicle. Additionally, the attachment between the duct member 26 and the lower support 12 may be designed to tear away when the force exceeds a predetermined amount and prior to the maximum strength of the lower support 12 to prevent damage thereto.

Figure 2A:
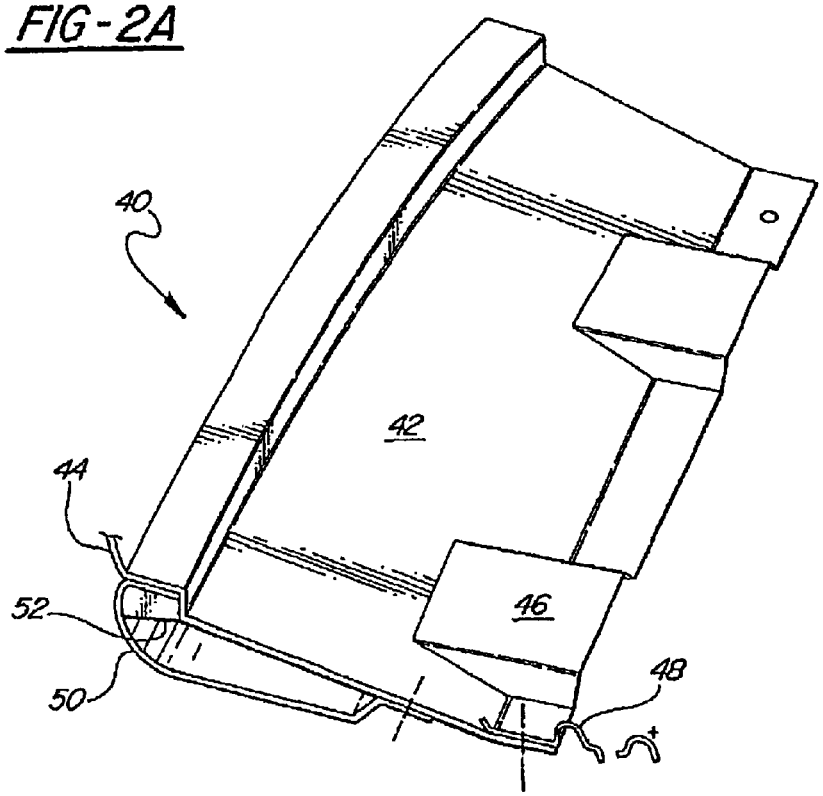
FIG. 2A is a perspective view of an alternative embodiment of a pedestrian protection assembly.
Figure 2B:
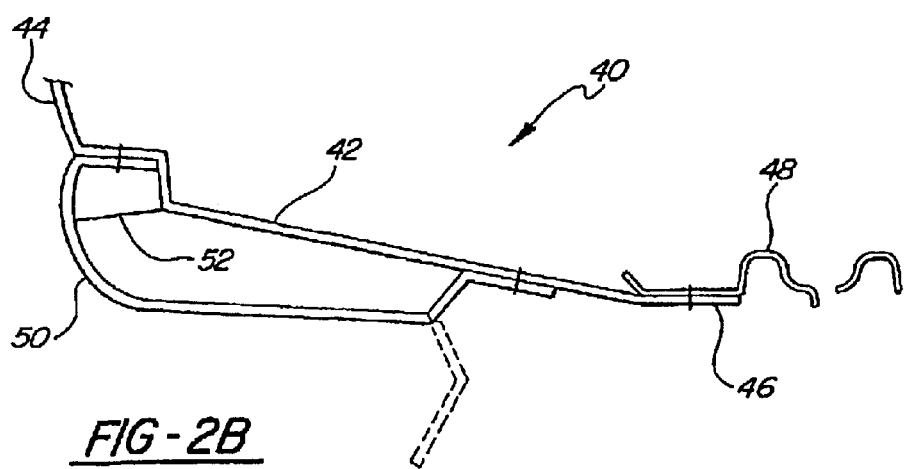
FIG. 2B is a cross-sectional side view of the embodiment of FIG. 2A.

Referring to FIGS. 2A and 2B, an alternative pedestrian protection assembly is generally shown at 40. The pedestrian protection assembly 40 includes a facia chin 42 having a front portion 44 adjacent the front end of the vehicle and a rear portion 46 fixedly secured to a rigid lower support member 48. A contoured box-like spoiler 50 is fixedly secured to the facia chin 42 between the front portion 44 and the rear portion 46. The spoiler 50 similarly includes a longitudinal, structural reinforcing rib 52 for increasing the structural rigidity of the spoiler 50. The spoiler 50 is rigid in the fore and aft direction, however, may flex upwardly to allow ground clearance should the front of the vehicle approach a ramped surface. The operation of the spoiler 50 is equivalent to the operation of the assembly 10 of FIG. 1.

Referring to FIG. 3, another alternative embodiment of a pedestrian protection assembly is shown at 60. The assembly 60 is a combination of the structure of FIGS. 1, 2A and 2B. Specifically, the assembly 60 includes a front facia chin 62 having a front face 64, a lower portion 66 and an upper portion 68 which may be attached to the grill (not shown). An arcuate-shaped front spoiler 70 is connected to the lower portion 66 of the facia chin 62. The assembly 60 further includes a rigid duct member 72 extending between the facia chin 62 and the lower support member 74. More specifically, the duct member 72 includes a forward end 76 secured to the lower portion 66 of the facia chin 62 and a rearward end 78 secured to the lower support member 74. The duct member 72 also includes structural reinforcing ribs 80 extending longitudinally between the forward end 76 and the rearward end 78. The duct member 72 provides structural rigidity to the facia chin 62 upon impact with a pedestrian while the spoiler 70 is allowed to flex upwardly upon impact with a ramp surface by the vehicle.

Referring to FIG. 4, still another alternative embodiment of a pedestrian protection assembly is shown at 100. The assembly 100 includes an upper bumper support beam 102 and a lower tubular support 104. The upper bumper support beam 102 is rigidly supported by the frame of the vehicle. The lower tubular support 104 is spaced below the upper bumper support beam 102. The assembly 100 further includes a bumper 106 operatively coupled to the upper bumper support beam 102 and movable between a normal position, shown in solid lines, and an impact position, shown in dashed lines. More specifically, the bumper 106 includes an outer shell 108 having a front face 109 and a bottom portion 111. A sloped, or ramped, rib 110 extends between the front face 109 of the outer shell 108 and the upper bumper support beam 102. A foam pad 112 is supported between the front face 109 and the support beam 102. A grill 114 extends downwardly from the bottom portion 111 of the bumper 106 and supports a generally U-shaped facia chin 116. The facia chin 116 is further supported by the lower tubular support 104.

In operation, should the vehicle contact a pedestrian with the bumper 106 in the normal position, the bumper 106 will be impacted first by the pedestrian and forced rearwardly against the upper bumper support beam 102. The ramped rib 110 will ride along the support beam 102 and force the bumper 106 downwardly as it travels rearwardly along the support beam 102. This rearward and downward movement of the bumper 106 forces the grill 114, and therefore, the facia chin 116 and lower tubular support 104 downwardly as shown in dashed lines. The facia chin 116 is now positioned forward of the bumper 106 to contact the lower leg portion of the pedestrian, below the knee, to reduce knee buckle and other injury to the pedestrian. Therefore, initial leg impact by the pedestrian is with the bumper 106. This initial leg impact forces the bumper 106 rearwardly and downwardly by the contact of the ramped rib 110 with the beam 102. Additionally, the impact forces may be absorbed by the foam pad 112, and thus, reduced by the movement of the bumper 106. The facia chin 116 is then moved downwardly by the bumper 106 prior to any impact by the pedestrian.

Finally, referring to FIG. 5, still another alternative embodiment of a pedestrian protection assembly is shown at 120. The assembly 120 is similar to the facia chin shown in FIG. 4 wherein a facia chin 122 is supported by the lower portion of a grill 124. The facia chin 122 includes a U-shaped outer shell 126 having a front face 128, a top portion 130 connected to the grill 124, and a bottom portion 132. The facia chin 122 is further support by a tubular support beam 134. The facia chin 122 includes a chin reinforcement structure 136 projecting from the outer shell 126 toward the support beam 134. The reinforcement structure 136 includes a ramped surface 138 engaged with the support beam 134.

In operation, when the front face 128 contacts the lower leg of a pedestrian, the facia chin 122 will be forced rearwardly toward the support beam 134. The ramped surface 138 will ride against the support beam 134 forcing the beam 134 downwardly to the position shown in dashed lines. Therefore, the impact force F is absorbed by the movement of the facia chin 122 and the rigid support beam 134 is lowered for further impact with the lower leg below the knee portion of the pedestrian.

The invention has been described in an illustrative manner, and it is to be understood that the terminology, which has been used, is intended to be in the nature of words of description rather than of limitation. Many modification and variations of the present invention are possible in light of the above teachings. It is, therefore, to be understood that within the scope of the appended claims, the invention may be practiced other than as specifically described.

What is claimed is:

1. A pedestrian protection assembly supported between a front grill member and lower support of an automotive vehicle comprising:
   a box-like facia chin adapted to be fixedly secured to the grill member and having a front face spaced from an opposing rear face; and
   a duct member fixedly secured to said rear face of said facia chin and adapted to be fixedly secured to the lower support whereby said pedestrian protection assembly provides a rigid lower impact structure during fore/aft vehicle impact with a structure.

2. A pedestrian protection assembly as set forth in claim 1 wherein said duct member includes at least one structural rib extending between said facia chin and the lower support for providing structural rigidity to said pedestrian protection assembly.

3. A pedestrian protection assembly as set forth in claim 2 wherein said facia chin further includes an upper portion adapted to fixedly secure said facia chin to the grill member and a lower portion extending between said front and rear face to close said box-like facia chin.

4. A pedestrian protection assembly supported by a bumper support beam of an automotive vehicle comprising:
   a bumper operatively coupled to the bumper support beam, said bumper having an outer shell spaced from the support beam for supporting a resilient foam pad and a ramped rib projecting from said outer shell for engaging the bumper support beam;
   a grill portion extending from a first end connected to said outer shell of said bumper to a second end spaced below said bumper and the bumper support beam;
   a facia chin having a top portion secured to said second end of said grill portion, a bottom portion and a front face; and
   a lower support member for supporting said facia chin between said top portion, bottom portion and said front face; wherein said ramped rib engages with the bumper support beam in response to an impact force applied against said outer shell of said bumper to automatically force said facia chin downwardly with said front face spaced forward of said bumper.

5. A pedestrian protection assembly as set forth in claim 4 wherein said outer shell includes a front face and a bottom portion for supporting said grill portion, said ramped rib extends upwardly from said bottom portion between said front face and said bumper support beam for automatically forcing said facia chin downwardly in response to said impact force moving said outer shell from a normal position with said front face spaced from said bumper support beam to an impact position with said front face moved toward said bumper support beam.

6. A pedestrian protection assembly as set forth in claim 5 wherein said foam pad is seated between said front face of said outer shell and said bumper support beam for absorbing energy from said impact force upon movement of said bumper from said normal position to said impact position.

7. A pedestrian protection assembly supported by a bumper support beam of an automotive vehicle comprising:

a bumper operatively coupled to the bumper support beam, said bumper having an outer shell spaced from the support beam for supporting a resilient foam pad;

a grill portion extending from a first end connected to said outer shell of said bumper to a second end spaced below said bumper and the bumper support beam;

a facia chin having a top portion secured to said second end of said grill portion, a bottom portion and a front face; said facia chin further including a ramped reinforcing rib extending from said bottom portion to said top portion; and a lower support member for supporting said facia chin between said top portion, bottom portion and said front face; wherein said ramped rib engages with said lower support member in response to an impact force applied against said facia chin to automatically force said facia chin downwardly for fore/aft vehicle impact with a structure.

8. A pedestrian protection assembly as set forth in claim 7 wherein said ramped rib extends from said front face toward said lower support member for providing structural reinforcement to said facia chin to receive said impact force.

* * * * *